Oct. 29, 1968  B. F. RANDRUP  3,407,564
WIRE HOOD LOADING APPARATUS
Filed Feb. 21, 1966  4 Sheets-Sheet 1

INVENTOR.
BENJAMIN F. RANDRUP
BY Schapp & Hatch
ATTORNEYS

INVENTOR.
BENJAMIN F. RANDRUP
BY
Schapp & Hatch
ATTORNEYS

Oct. 29, 1968  B. F. RANDRUP  3,407,564
WIRE HOOD LOADING APPARATUS
Filed Feb. 21, 1966  4 Sheets-Sheet 3

INVENTOR.
BENJAMIN F. RANDRUP
BY
Schapp & Hatch
ATTORNEYS

INVENTOR.
BENJAMIN F. RANDRUP
BY Schapp & Hatch
ATTORNEYS

3,407,564
WIRE HOOD LOADING APPARATUS
Benjamin F. Randrup, 423 Roberta Ave.,
Pleasant Hill, Calif. 94523
Filed Feb. 21, 1966, Ser. No. 528,855
14 Claims. (Cl. 53—128)

ABSTRACT OF THE DISCLOSURE

A wire hood loading apparatus comprising a chute formed to hold wire hoods in accurately oriented inverted position with the smaller more circular top portion of the hood protruding from the bottom chute, a pair of jaw like grippers adapted to clamp on the top of the wire hood and positively withdrawn from the other wire hoods in the stack located in the chute, and carriage means formed for moving the gripper into position for obtaining a wire hood from the chute and placing it accurately in oriented position on a bottle closure placed for receiving the wire hood. The apparatus is provided with various structures for assuring proper orientation of the hoods in the chute and maintaining uniform weight on the bottom hood as well as providing different types of grippers for handling different types of hoods and means for synchronizing the various movements to positively assure reliability.

---

Figure 1:
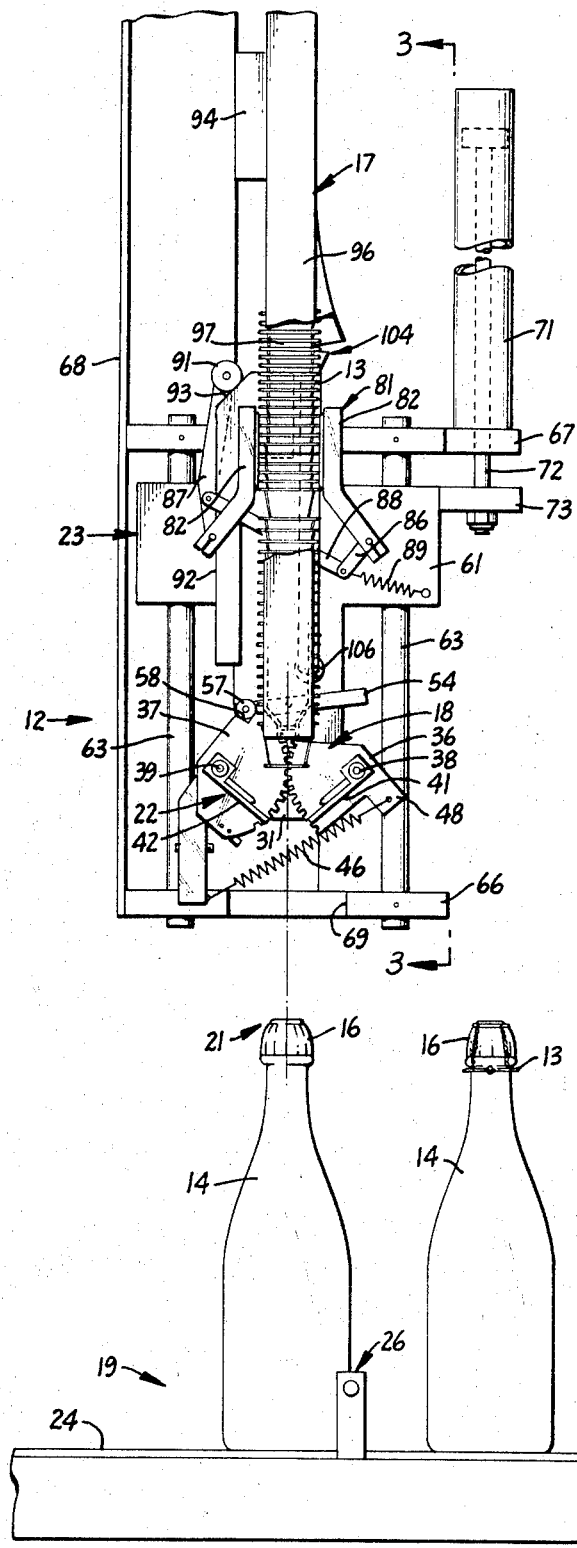
Figure 2A:
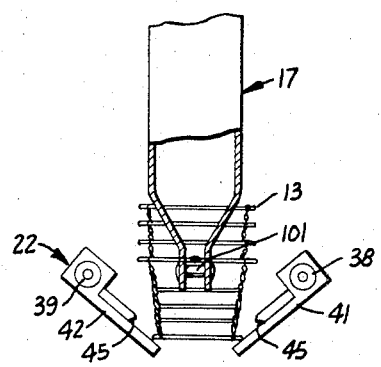
Figure 2B:
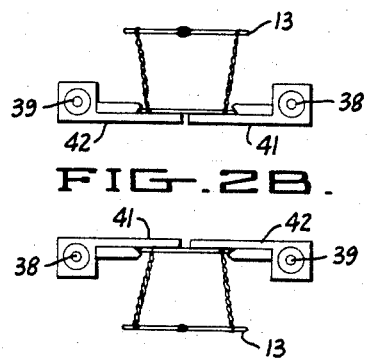
Figure 2C:
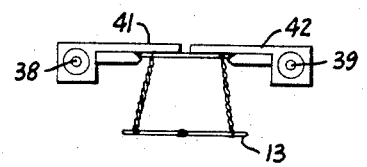
Figure 2D:
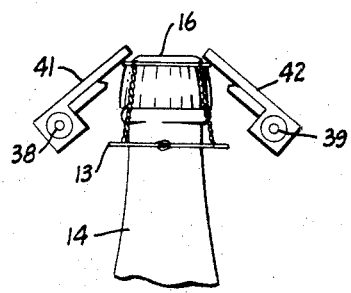

The present invention relates to a wire hood loading apparatus, and more particular to a wire hood loading apparatus designed to place wire hoods which are formed from a wire frame having a generally frustoconical configuration on an article shaped to receive the wire.

In its broad application, the invention provides a machine for automatically positioning wire hoods indirectly or directly in place on an article of any type where such an operation might be desired. However, the apparatus of this invention has been specifically developed to solve a serious problem in the bottling of carbonated wines such as champagne, and it will be described specifically in that connection herein.

It is well known that in industries such as the wine industry, a number of sequential operations must be carried out, and these operations are preferably accomplished through machinery programmed to function automatically. Originally, all of these operations were done by hand, but most of the operations have now been converted to machine operations. It is particularly valuable, therefore, to provide machine operations for all of the procedures, and particularly those procedures which are accomplished together to perform steps completing a given phase of manufacture. When it is necessary to perform part of a sequential procedure by hand and the remaining operations are done by machine, the entire operation is frequently slowed down and the maximum use of the machine parts in the operation is not achieved.

However, certain steps have been very difficult to mechanize, and efforts toward mechanization of these operations have been so unsuccessful that the industry still utilizes hand methods. One of these operations is that of adding wire hoods to corked champagne bottles prior to the securing of the wire hood over the cork or closure during the final packaging operation.

This is a particularly serious problem, because packaging machinery is well known and the other operations such as application of the closure, labeling and packaging, have been automated and can be carried out in a rapid and efficient manner. The handling of the wire hoods, however, including placement of the hoods in position over the tops of the champagne bottles and the twisting of the hoods in position to secure the closure, has presented considerable difficulty. The difficulty arises from the nature of the wire hoods in that the hoods are generally not compltely uniform and these imperfections cause difficulty in machine handling. This is particularly true where the hoods are to be taken from a stack of wire hoods in which they are supplied and placed in position on the bottle for subsequent tying operations.

The tying operation itself has also caused a certain amount of difficulty, but there is at least one commercial machine available that can accomplish this result. However, prior to the present invention, no machine has been used commercially and been successful insofar as the placement of the hoods on the bottle is concerned. In addition, I have also developed a machine for tying wire hoods which is particularly valuable in cooperating with this machine and other pieces of automatic equipment to provide a fully automated packaging operation. The subject matter of my wire tying machine will be covered in another patent application to be filed in the future.

In one of the known tying machines, the wire hoods are placed on a holder above the bottle so that it is finally positioned by raising the bottle up under the hood. This placement of the hood may be carried out by the machine described herein, and it should be understood that such indirect placement is also within the ambit of this invention.

Accordingly, it is a primary object of the present invention to provide a wire hood loading apparatus for automatically placing wire hoods on a bottle, in which the apparatus is reliable in performance, efficient in operation, and provides considerable improvement in connection with speed and cost factors.

Another object of the invention is to provide a wire hood loading apparatus of the character described in which certain of the parts may be interchanged to accommodate modifications and enable the machine to be programmed to handle a variety of different sizes and shapes of wire hoods and similar articles.

A further object of the invention is to provide an apparatus of the character described in which the wire hoods are pulled forceably from an inverted stack of wire hoods so that positive gripping of a single wire hood by the apparatus is assured, yet the apparatus operates to invert the hood and place it over the bottle or container by means of a gravity system whereby injury to the bottle or apparatus is positively avoided.

Still another object of the invention is to provide a wire hood loading apparatus of the character described which is capable of being added in place on a conveyor system and operates through known automation control systems whereby speedy, reliable operation may be obtained and the machine used as a valuable part of a completely integrated system.

A still further object of the invention is to provide a wire hood loading apparatus of the character described in which all of the mechanical motions are positively and accurately adjusted and synchronized through reliable cams and gear mechanisms.

Further objects and advantages of the invention will be apparent as the specification progresses and the new and useful features of the wire hood loading apparatus will be fully defined in the claims attached hereto.

In its broad aspect, the wire hood loading apparatus of this invention includes means for holding a plurality of wire hoods formed for presenting the hoods in one-by-one fashion to a delivery position, means for positioning articles adapted to receive wire hoods in sequential fashion at a hood receiving position, and a device including a gripper constructed to engage a wire hood at the delivery position and grip the hood for movement to the receiving position. The gripper is adapted to grab a wire hood at the upper side thereof and considerable latitude in the construction of the wire hoods may be permitted. In fact, it is believed that the wire hood loading apparatus of this invention could be adapted to place lids or the like on a bottle, if desired. However, the apparatus has been specifically developed to solve problems in handling wire hoods which are formed from a wire frame having a generally frustoconical configuration.

Typical wire hoods will contain a pair of generally circular wires with one circle being smaller than the other circle and having a multiplicity of diagonally extending wires connecting the two circles together so that the circles lie in substantially parallel planes. The larger and lower circle is generally shaped more like a loop than a circle, and has a protrusion from one side thereof. In some cases, it also has another protrusion on the side opposite the first protrusion. Where the wire hoods have these protrusions, it is important that the hoods be accurately placed with respect to the bottle so that the subsequent tying operation can be performed more easily.

Thus, in its specific aspect, the invention provides means for placing wire hoods in accurately oriented position so that the hood may be tied by a subsequent machine. In order to mechanize this operation, it is important to be able to handle the wire hoods so that they do not become tangled or bent out of shape during the handling thereof. The difficulty involved in avoiding tangling is made more serious because the hoods are generally made in an inexpensive manner from wire, and the hoods are not always of exactly the same size. In addition, the hoods bend easily and slight changes in shape must be permitted without destroying the machine operation for handling hoods. Due to these difficulties, prior commercial wire hood loading has been done by hand, with the operator taking hoods from the stack and placing them on the bottles (or in position to be received by the bottles) in one-by-one fashion as the bottles are moved by a conveyor.

In accordance with the present invention, a novel holding means is provided, which is in the form of a chute. The wires are held in an accurately oriented position and are preferably placed in inverted fashion so that the smaller, more circular top of the hood protrudes from the bottom of the chute. The machine also contains a pair of jaw-like grippers adapted to clamp on the top of the wire hood and positively withdraw it from the other wire hoods in the stack located in the chute so as to overcome the most difficult problem in prior machines of this nature. The gripper is then moved over to the delivery position and inverted during this movement so that the jaws come down over the bottle or the like to receive the hoods and positive, accurate placement is assured.

Figure 3:
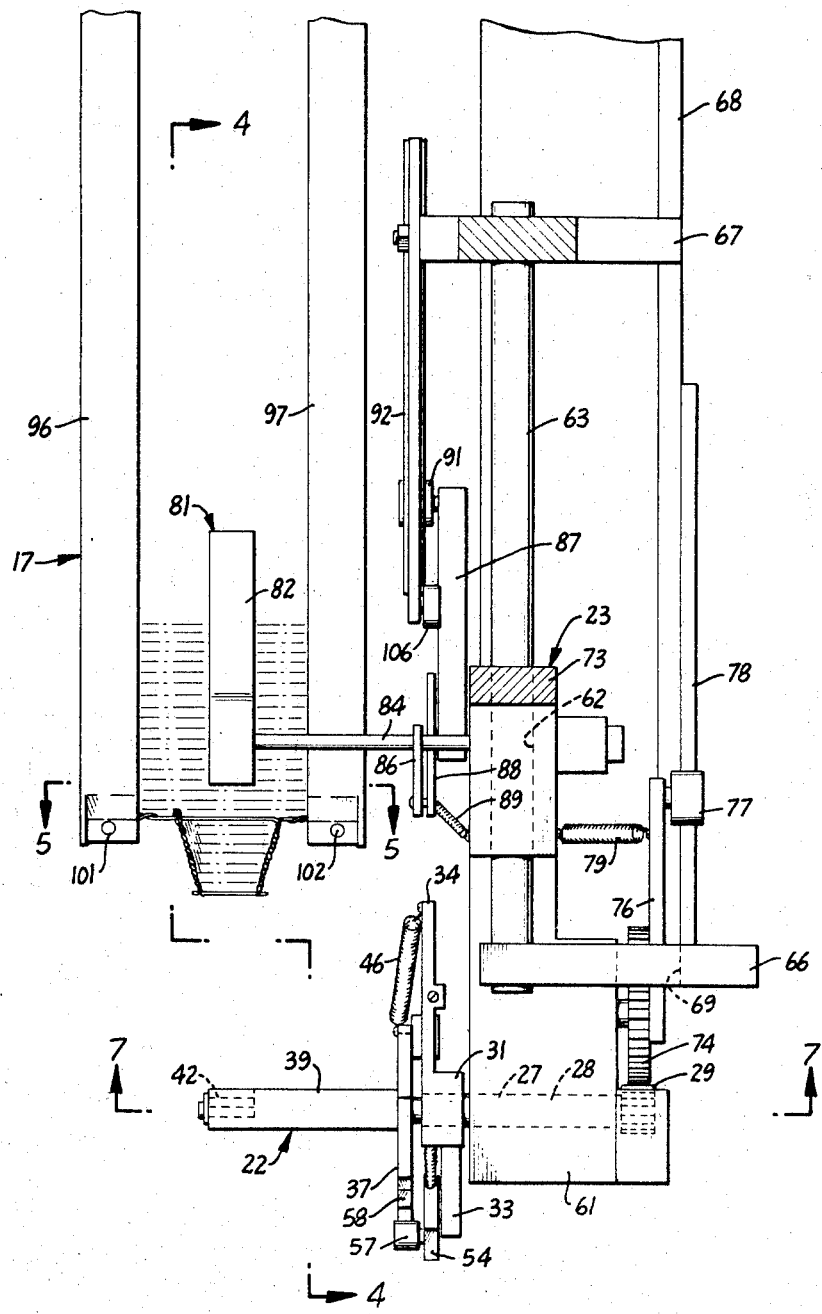
Figure 4:
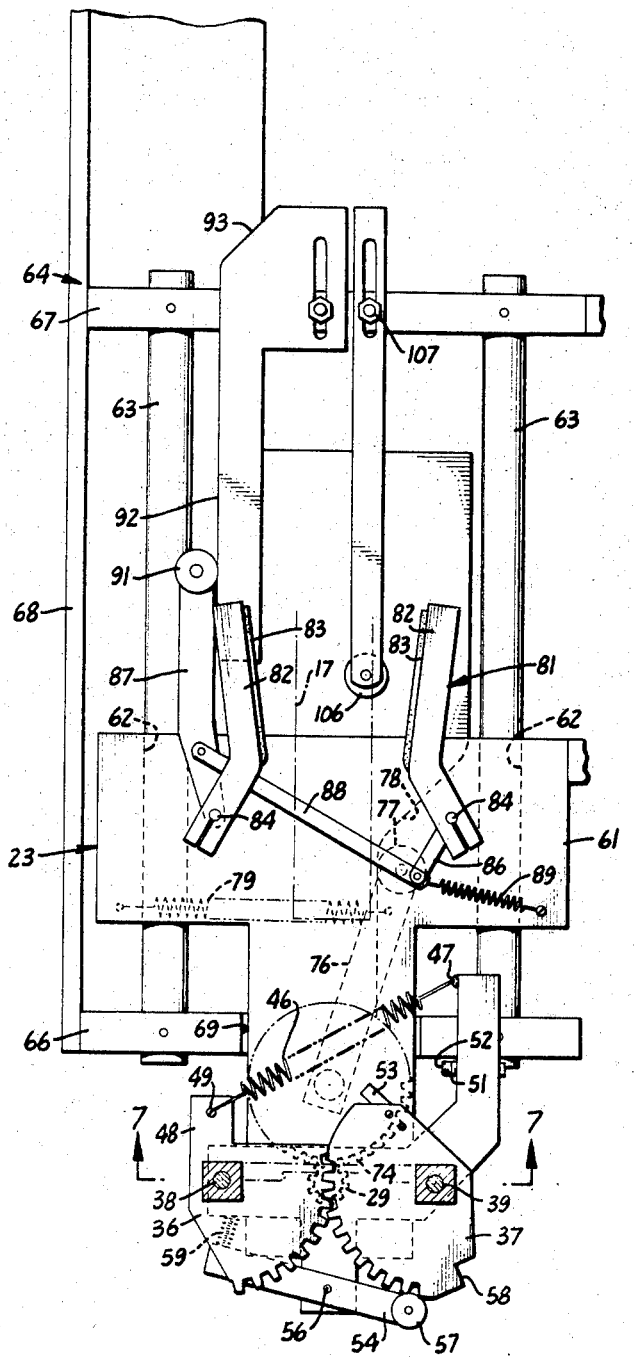
Figure 5:
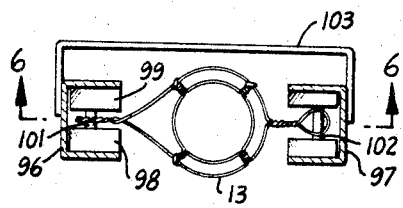
Figure 6:
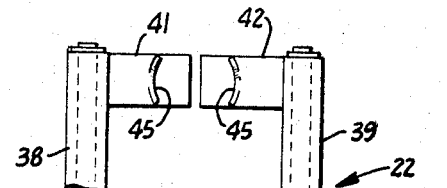
Figure 6:
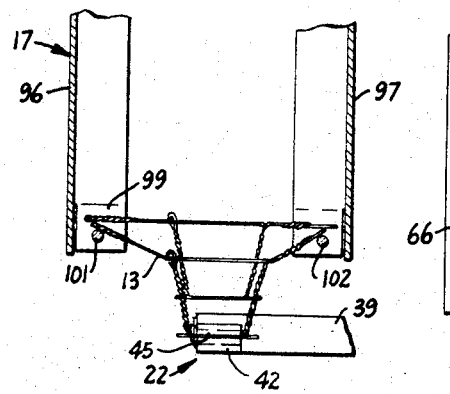
Figure 7:
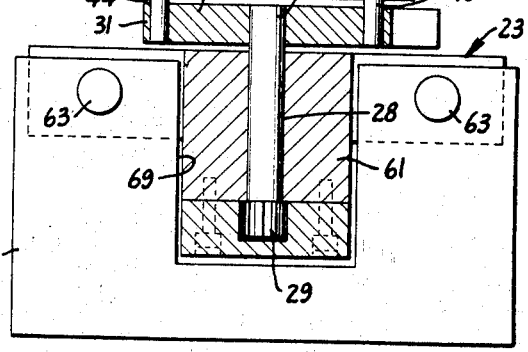
Figure 10:
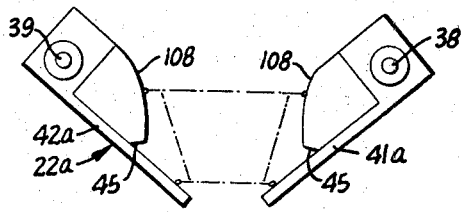
Figure 8:
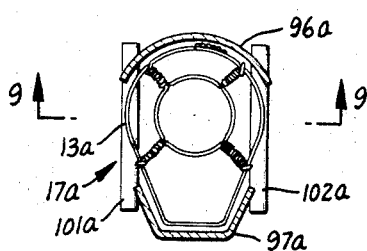
Figure 11:
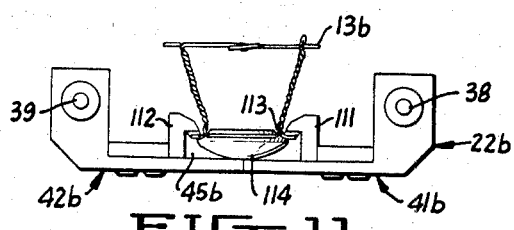
Figure 9:
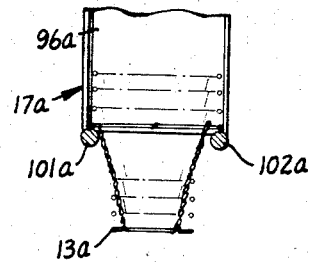

The preferred form of the invention is illustrated in the accompanying drawings forming a part of this specification, in which:

FIGURE 1 is a side elevational view of the apparatus with certain of the structures being removed for clarity and to better illustrate certain of the internal structures;

FIGURE 2-A, an enlarged view of a portion of the apparatus illustrated in FIGURE 1, indicating the position of the grippers just prior to gripping a wire hood;

FIGURE 2-B, a view similar to that shown in FIGURE 2-A, but illustrating the position of the apparatus of FIGURE 2-A after the gripper has engaged a wire hood;

FIGURE 2-C, a view similar to those shown in FIGURES 2-A and 2-B but in a later stage of the operation where the wire hood has been inverted and is ready for placement on a bottle;

FIGURE 2-D, a view similar to those shown in FIGURES 2-A, 2-B and 2-C but in the final stage of the transfer of the wire hood and illustrating how the hood is released in position on the bottle;

FIGURE 3, an enlarged elevational view of the apparatus shown in FIGURE 1, taken substantially in the plane of line 3—3 thereof;

FIGURE 4, a sectional elevational view of the apparatus shown in FIGURES 1 and 3 taken substantially in the plane of line 4—4 of FIGURE 3, with the chute removed to better illustrate internal parts;

FIGURE 5, a cross-sectional view of a portion of the apparatus shown in FIGURE 3, taken substantially in the plane of line 5—5 thereof;

FIGURE 6, a cross-sectional view of the structure shown in FIGURE 5, taken substantially in the plane of line 6—6 thereof;

FIGURE 7, a cross-sectional view of the apparatus of FIGURES 1 through 6 taken substantially in the plane of line 7—7 of FIGURE 3;

FIGURE 8, a view similar to that shown in FIGURE 5, but illustrating an alternate type wire hood that can be handled by the apparatus of this invention together with a modified form of chute means for holding the wire hoods;

FIGURE 9, a cross-sectional view of the apparatus shown in FIGURE 8 taken substantially in the plane of line 9—9 thereof;

FIGURE 10, a view similar to that shown in FIGURE 2-A but illustrating a preferred modified form of gripper to be used with the wire hoods illustrated in FIGURES 8 and 9; and FIGURE 11, a view similar to that shown in FIGURE 2-B, but illustrating a modified form of gripper to be utilized when the wire hoods of the embodiment illustrated in FIGURES 1 through 7 are equipped with a metal cap at the upper portion of the wire hood.

While only the preferred forms of the invention are shown, it should be understood that various changes or modifications may be made within the scope of the claims attached hereto without departing from the spirit of the invention.

Referring to the drawings in greater detail, and more particularly to FIGURE 1, there is shown a wire hood loading apparatus 12 for automatically placing wire hoods 13 in position over the top of a bottle 14 and closure 16, comprising a chute 17 for holding a plurality of wire hoods 13 in an inverted stacked relation whereby the hoods are presented bottom-end down in one-by-one fashion to a hood delivery position 18, indexing means 19 for positioning the bottles 14 or other article adapted to receive wire hoods 13 in sequential fashion at a hood receiving position 21, a gripper 22 constructed to engage a wire hood 13 at the hood delivery position 18 and release the hood at the receiving position 21, and carriage means 23 for moving the gripper between the delivery position and the receiving position and inverting the gripper during said movement so that the hood will be released on the bottle at the receiving position in proper orientation.

The indexing means 19 may include any suitable device for positioning the bottle 14 so that the bottle top is properly located at hood receiving position 21, as illustrated in FIGURE 1. Generally, the indexing means 19 will be an indexing conveyor and the preferred indexing conveyor is that described and claimed in my co-pending United States application Ser. No. 451,524, filed Apr. 28, 1965, and entitled Indexing Device, now Patent No. 3,355,856.

As shown in this co-pending application, the indexing device includes a conveyor 24 and holding means 26 for holding the bottle in the proper indexed position for a time sufficient to allow the operation desired at the index position to be carried out. As set forth more thoroughly in my Patent No. 3,355,856, automatic means are provided for synchronizing the operation of other devices such as the wire hood loading apparatus of the present invention with the operation of the indexing conveyor. If desired, the wire hood can be loaded onto the bottle by the apparatus of the present invention and then secured in place by another apparatus before moving the bottle on from the indexed position. Alternatively, other programming could be effected whereby one or more operations takes place when the bottle is in the same position. However, it will be appreciated that all of these and other variations in programming are possible with the present invention, which is designed to carry out the specific operation of loading the wire hoods in position for subsequent tying of the hood onto the bottle.

In general, the gripper 22 may be any device capable of gripping the wire at the delivery position and releasing it at the receiving position. The movement for the gripper is provided by the carriage and the gripper is moved transversely by such movement on the carriage and rotatably movable with respect to the carriage by virtue of its mount. Thus, in the preferred form shown in the drawings, and best seen in FIGURES 3 and 7, there is shown a gripper 22 rotatably mounted on carriage 23 through a shaft 27 journaled through bearing 28 and rotatably driven by spur gear 29 located on shaft 27 at its other extremity.

The gripper also comprises a main frame member 31 which is fixed to the shaft 27 for rotation therewith. As here shown, the frame 31 has a transverse arm 32 and a branch arm 33 joining the transverse arm 32 at a center thereof and another arm 34 extending from one of the extremities. A pair of gear members 36 and 37 are journaled to the transverse arm 32 and fit together in meshing relationship as best seen in FIGURE 4. In axial alignment with the center of rotation of each of the gear members 36 and 37, there is provided a pair of jaw shafts 38 and 39 which in turn carry jaw members 41 and 42 in opposed fashion, as best seen in FIGURE 8.

The jaw members and jaw shafts are rigidly fixed to each of their associated gear members so that the jaw members rotate the same degree of rotation as the gears but in transversed spaced relation therefrom. The rotation of the gear members and their associated jaw shafts and jaw members is effected through rotatable mountings through shafts 43 and 44 journaled in transverse arm 32 through suitable supports. The jaw members are each provided with a slot 45 formed to receive the wire of the hood on each side to hold the hood.

As best seen in FIGURES 3 and 4, the gear members are normally urged to rotate so as to place the jaws in the closed position shown in FIGURES 2–B, 2–C and 7 by means of spring 46. This spring is held in tension and anchored at each end by attachment to the arm 34 of frame member 31 at 47 and to an upstanding arm 48 of gear 36 at 49. In order to adjust the open position of the jaw members accurately, an adjustable stop is provided in the form of set screw 51 which is adjustably threaded through arm 34 and has a contact surface 52 adapted to abut stop plug 53 which is secured to gear member 37 as best seen in FIGURE 4.

Thus, it is seen that spring 46 is retained in tension at all times so as to normally urge the jaw members into a closed position. In order to hold the jaw members in an open position, when desired, a latch 54 is provided with the latch being pivoted to branch arm 33 of frame member 31 at 56 so that its catch 57 may engage in a slot 58 of gear member 37. Thus, when the jaw members are open to a sufficient degree for the catch 57 to reach slot 58, the latch moves in place and holds the gear against the tension of spring 46. In order to assure latching, the latch may be made so that it is heavy enough at the far end to cause automatic latching. As here shown, the latch is urged into latched position by means of a compression spring 59, which pushes against the far end of the latch.

Thus, it is seen that the gripper is provided with a mechanism for urging the jaws together and holding them in position, as well as means for holding the jaws in released position. In the form illustrated herein, the agency for moving the jaws apart is the bottle top itself, so that when the gripper places the wire hood on the bottle, and continues downward, the bottle top or stationary wire hood pushes the jaw members apart against tension spring 46 and allows the latch 54 to operate and hold the jaws in open position. Where the hood is placed on a holder for indirect positioning on the bottle, the holder stops the hood and this causes the jaw members to open.

While the gripper returns to the delivery position, the jaws remain open through the agency of the latch. However, upon reaching the delivery position for the wire hoods, a suitable latch trip is provided to trip latch 54 and allow the jaws to snap closed through the force exerted by spring 46. The jaws then remain closed until opened again by the positioning of a wire hood on the bottle.

The gross movement of the gripper is achieved by movement of the carriage on which the gripper is mounted, together with rotational movement of the mounting shaft 27 of the gripper. Thus, the carriage is mounted for transverse movement between two lateral positions, and in the preferred form, this transverse movement is vertical. Thus, as here shown, the carriage means 23 comprises a generally T-shaped body block 61 having a pair of bores 62 adapted to fit in sliding engagement with a pair of vertical support rods 63 so that the carriage can move vertically between the positions shown in FIGURE 1 and the position shown in FIGURE 3. The support rods 63 are formed as a part of a main support frame 64 which also comprises a pair of horizontal beams 66 and 67 between which the support rods extend. These horizontal beams then may be mounted on one or more main vertical beams or posts 68 in accordance with any usual procedure for supporting machines. The main support frame 64 may be carried on the conveyor or mounted in juxtaposed position thereto in order to achieve proper positioning between the hood delivery position of the chute and the hood receiving position on the indexing means.

In the structure here shown, the horizontal beam 66 has a cutaway 69 to accommodate the lower end of the body block 61 of the carriage.

In order to provide vertical movement to the carriage, a fluid cylinder 71 is mounted on the horizontal beam 67 and has a connecting rod 72 journaled through the member and carried within the cylinder in the usual fashion for vertical movement of the rod within the cylinder. The distal end of connecting rod 72 is fastened to a lug 73 on the body block 61 of the carriage.

Preferably, the fluid cylinder is an air cylinder operative to provide lift to the carriage when the cylinder is charged with compressed air and operative to allow the carriage to return by gravity when the air supply to the cylinder is shut off and the air within the cylinder is allowed to bleed away in controlled fashion to adjust the rate of descent of the carriage. The air cylinders are well known in the trade and a thorough description thereof is deemed unnecessary. Alternative lift means could be provided if desired, such as a mechanical lift operatively attached to a motor for providing the rise of the carriage and capable of being disconnected and braked to allow controlled descent of the carriage by gravity.

In addition to the up and down movement of the carriage, the carriage is constructed to provide rotation of about 180° to the gripper in order to provide inversion of the gripper between the upper and lower position of the carriage. As best seen in FIGURES 3 and 4, this rotation is provided by means of gear member 74 rotatably mounted in the body block 61 of the carriage and positioned to fit into engagement with spur gear 29 of the gripper, a cam arm 76 rigidly attached to and rotatable with the gear member 74, a cam follower 77 on the cam arm 76, and a cam plate 78. As best seen in FIGURE 4, the cam plate 78 causes the cam follower 77 to move the cam arm 76 through a small angle of rotation during the up and down movement of the carriage. It should be noted that this cam arm does not impart any rotation at either the extreme upper or extreme lower positions of the carriage, but only during an intermediate position thereof. This small angle of rotation on the cam arm 76 provides a similar angle of rotation on gear member 74, which in turn provides about a half revolution of rotation to the small spur gear 29 by virtue of the relative gear sizes, as is well known in the art. In order to assure that the cam arm follows the cam plate 78, the cam arm is held securely thereagainst by means of a suitable spring 79.

Thus, it is seen that as the carriage is moved upward by the air cylinder and allowed to return downward, the gripper is positively inverted through a reliable mechanical means that positively assures the desired performance.

The carriage also contains a wire hood lift means 81 utilized to lift the stacks of wire hoods at some distance from the lower end of the stack and lift the remaining hoods so that the weight on the bottom wire hood will not be excessive. The lift means 81 comprises a pair of stack engaging arms 82 located on each side of the chute 17 in position to grip wire hoods stacked within the chute. The engaging arms 82 are preferably lined with rubber pads 83 in order to avoid injury to the hoods with the engaging arms being constructed to engage a section of wire hoods and lift them a small distance, as best seen in FIGURE 1.

The engaging arms 82 are carried on shafts 84 which are journaled for rotation in the body block 61 of the carriage. Thus, the engaging arms move up and down with the carriage, but they are normally out of engagement with the wire hoods within the stack. In order to provide the desired engagement and lift, shafts 84 are rotated by suitable control means to bring arms 82 into contact with the stack just before the carriage reaches its uppermost position.

The rotating means includes linkage arms 86 and 87 which are connected to rod 84 and linked together through connecting arm 88. Connecting arm 88 is urged by spring 89 to cause the rotation of rods 84 that would bring arms 82 against the wire stack. However, linkage arm 87 is also a cam arm and contains a cam follower 91 bearing against cam plate 92. As best seen in FIGURE 1, this cam plate 92 prevents rotation of shafts 84 and associated engaging arms 82 during most of the rise of the carriage, but during the latter portion the cam plate 92 has its surface drop off at 93 and allow the effective rotation. At this time, the carriage still has a slight distance to move, and the stack of wire hoods about a set position are raised, as best indicated in FIGURE 1.

The chute 17 is suitably mounted in vertical orientation on the main support frame 64 near its upper end by means of support member 94. As here shown, the chute comprises a pair of opposed channels 96 and 97 which are constructed to hold the irregular ends of the base portion of the frustoconical wire hood. One of the standard wire hoods has one side of the base of the hood twisted to form a loop thereon and the other side containing two wire ends generally twisted together. The apparatus illustrated in the embodiment of FIGURES 1 through 7 has been designed specifically with this type of wire hood in mind and the gripper has been constructed to seize either side of the wire hood of this nature. In similar fashion, the chute 17 is constructed with the channels on each side adapted to support these hoods in aligned fashion.

As best seen in FIGURES 5 and 6, channels 96 and 97 are spaced apart sufficiently to accommodate the proper length of the base of the hood and have generally opposed open ends from the channel so that the wire hoods may be securely held in place. The channels are somewhat wider than the extended portion of the hood in the upper portions of the chute to allow variations of sizes, but in the lower portion of each channel 96 and 97, the channel contains funnel-like walls 98 and 99 which tend to provide exact alignment for the bottom hood.

The bottom hood and the entire stack of the hoods above the bottom hood are held in the chute by means of horizontal rods 101 and 102. These rods are placed near the extremities of the wire hood so that the hoods may be pulled clear of the rods by the gripper, with the weight of the carriage operating against the wire. The wire hoods are made elastic enough so that the slight deformity needed to pull the hood free of the rods is usually insufficient to cause the wire hoods to be deformed. However, it will be appreciated that some permanent deformity may be tolerated as long as it does not interfere with the fitting and tying of the hood on the bottle.

It will be noted that the sides of the stacked wire hoods are open to allow the engaging arms 82 to engage and lift at most any adjusted position along the stack. Since the two channels are disconnected over a considerable area of the length, it is sometimes desirable to tie them together at the end by tie member 103, but it will be appreciated that this member should be in a position that will not interfere with the operation of the gripper 22 or the engaging arms 82.

In operation, the machine is set up with all of the mechanisms suitably located and the mechanical devices may be checked through in test runs, if desired, to assure that these adjustments are accurate. The chute 17 is then loaded with a stack of wire hoods to provide a relatively large stack so that the machine may operate for quite a length of time without reloading the chute. In order to facilitate loading, the channel members 96 and 97 are broken away at 104 so that the hoods may be slipped laterally in at that point.

After the stacks are slipped in through this cutaway portion, the bottom hood is guided into the track down into the bottom and the nesting of the hoods within each other assures that the hoods will go past the cutaway portion 104 properly. As the lower portion of the chute is already loaded, the upper portion may be loaded by lifting the stack just below the cutaway point while leaving the lower portion of the chute full and sliding in additional wire hoods in the middle of the stack until the chute is completely loaded. In this way, it will be appreciated that the loading operation could take place even while the machine is in operation.

With the machine properly setup, a bottle 14 moves into indexing position by means of the indexing means, and a signal is passed on to air cylinder 71 to bring the carriage into its complete uppermost position. As the carriage rises, cam follower 77 causes rotation of the cam arm 76 which in turn rotates gear member 74 and spur gear 29 to rotate the gripper and place it in inverted position. As the carrier continues in its upward path, cam follower 91 slips over and allows linkage arms 86 and 87 to rotate engaging arms 82 against the stack of wire hoods in the chute. Then on final upward movement of the carriage, the engaging arms 82 lift the stack of wire hoods slightly and the gripper 22 comes into a position at the bottom of the stack, as shown in FIGURE 2-A. At this time, latch 54 strikes a latch trip 106 which has been suitably adjusted by its attachment 107 to the horizontal beam 67.

With the latch thus tripped, the gripper mechanism springs to the position shown in FIGURE 2–B. In view of the fact that a major portion of the stack of wire hoods has been lifted, there is no resistance to this snap engagement because the lower stack is free to lift as the gripper closes. However, it will be appreciated that with this type of wire hood and gripper, it is important to provide the lift means 81 and present a uniform back pressure to the bottom wire hood.

After the wire hood has been engaged, the air cylinder is shut off and the air is suitably released from the cylinder. This mechanism may be controlled by suitable limit switches (not shown) or other suitable devices. Obviously, a limit switch for this purpose could be placed on the latch trip mechanism 106 so that downward movement of the carriage would be dependent upon the tripping of the latch, if desired.

As the carriage moves downward, reverse activity takes place. Namely, the lift means 81 allows the stack to come down in its original manner and then moves away so that the engaging arms then move down freely, and the gripper is inverted by reverse rotation of its carrying shaft 28 through reverse operation of spur gear 29, gear members 74, cam arms 76, through the action of the cam follower 77 against cam plate 78.

When the gripper reaches its lower position, the gripper and the hood will appear as shown in FIGURE 2–C. The hood is now in position to be rested against the top of the bottle and as best seen in FIGURE 2–D this is what occurs when the carriage reaches its bottom position. As the gripper meets the top of the bottle, the jaw members are spread apart until the latch snaps in place and holds the grippers open. The carriage is then ready for another movement of upper travel.

The wire hood is firmly positioned by the weight of the carriage, and when fluted plastic corks are used, the hood automatically positions in the flute. Where the closure is of soft cork, a desired amount of pressing of the wire into the cork is achieved by this weight control. In the event of malfunction, the apparatus is protected, because the active loading force is by gravity. Thus, the gravity loading has many advantages.

Conveniently, the machine will probably be stopped either just before or just as the carriage reaches the upper position and grips a wire hood, if stopping is necessary. Otherwise, the movement of the carriage may be synchronized with the movement of the bottles to and through the indexing position. This may be achieved by limit switches mentioned above, with the requirement that not only tripping of the latch is necessary to allow the carriage to descend, but it is also necessary to receive a signal from the indexing means that the next bottle is in position. Suitable control for such operations will be found in my United States patent cited above, in which a suitable indexing means is described completely.

In the embodiment of FIGURES 1 through 7, the preferred form of gripper and chute construction has been shown for handling wire hoods in which the lower or larger circle of wire has a pointed end on one side and a twisted loop on the other side. However, it will be appreciated that other types of configurations of wire hoods are used in the wine industry and that as slight changes are made in the wire hoods, corresponding changes should be made in the chute construction and possibly in the jaw construction of the gripper in order to achieve the best results. Accordingly, such modifications are within the ambit of this invention and certain of these modifications will be described in order to illustrate the point more fully.

In FIGURES 8 through 10, there is shown a modified construction for the channel members of the chute and a modified construction for the jaws of the gripper. These modifications are especially valuable where the wire hoods are constructed as shown in FIGURES 8 through 10. Typically, such a wire hood has the same general configuration as the wire hood described above, except that the lower circular portion has a protrusion on only one side and this protrusion is simply an enlarged extension from the circle that would otherwise be formed, with the enlarged extension being provided so that the tying operation may proceed by twisting this extension and securing the lower circle against the neck of the bottle.

Referring more particularly to FIGURES 8 and 9, there is shown a chute 17a adapted to support wire hoods 13a in stacked relation. The chute 17a is similar to the chute 17 described above and generally comprises a pair of opposed channels 96a and 97a. The channel 96a has an arcuate configuration to fit the circular side of the wire hood 13a while the channel section 97a is in the form of a U, with the sides flared slightly outward to fit the configuration of the other side of the bottom loop of the wire hood. Rods 101a and 102a extend between these channels rather than within the channels, as in the embodiment illustrated in FIGURES 5 and 6. Thus, the stack of wire hoods is held between the parallel sides rather than the protruding ends in order to retain symmetry. In addition, these rods just barely grip the sides of the wire hoods so that the hoods may be pulled therepast, with their sides elastically yielding as described for the other form.

It will be appreciated from FIGURES 8 and 9 that the rods 101a and 102a may be used to provide spacing support for the channels 96a and 97a at the lower end of the chute. It will also be appreciated that the chute 17 illustrated in FIGURES 5 and 6 could be modified to utilize rod members extending in this fashion, if desired.

In FIGURE 10, the jaw shafts of a modified gripper 22a are shown. In this embodiment, the gripper operates in the same manner as gripper 22 and contains jaw members 41a and 42a mounted on jaw shafts 38 and 39, which are similar to those in gripper 22. The difference between the gripper 22a and the gripper 22 resides in the fact that the jaw members 41a and 42a contain convex surfaces 108 which are formed from an added member as in the provision of the slot 45 utiilzed in jaw members 41 and 42. The purpose of these convex surfaces is to absolutely center the wire hood being gripped prior to engagement thereof by the gripper. Thus, it will be appreciated that the gripper 22a could be used in the embodiment of FIGURES 1 through 7. In addition, it will be appreciated that the gripper shown in the embodiment of FIGURES 1 through 7 could be utilized with the chute 17a for handling wire hoods 13a.

Another form of wire hood that is utilized in the industry is a wire hood which may be similar to wire hood 13 or wire hood 13a except that it has a solid cap secured to the upper wire frame structure. This solid cap interferes with the gripping of this wire so that a modified jaw structure must be utilized for handling wire hoods constructed this way. Such a modified jaw structure is shown in FIGURE 11, where a wire hood 13b constructed with this closed top is also shown. As there shown, gripper 22b is otherwise similar to gripper 22 and mounted on jaw shafts 38 and 39. However, the jaw members 41b and 42b are constructed differently in that they contain auxiilary members 111 and 112 constructed with lips 113 to provide a modified slot 45b. This modified slot is needed because the jaw members actually grip the cover rather than the wire frame and this cover has greater depth than the thickness of the wire. Accordingly, the lips 113 are spaced at a proper distance so that the top 114 of wire hood 13b is securely clamped in position. Otherwise, the wire loading apparatus is similar to that described above.

Obviously, other modifications could be made to provide for changes in configuration of the wire hoods to be loaded without changing the overall operation of the machine. In addition, it will be appreciated that a given wire loading apparatus could be provided with accessories in the form of additional jaw members and possibly modified chute structures that could be substituted for those already on the machine in much the same manner that different accessories are provided for sewing machines and the like in order to carry out various operations.

From the foregoing description, it is seen that I have provided an improved wire hood loading apparatus which is capable of handling wire hoods of the type utilized in the wine industry to secure the closures over carbonated wines such as champagne or sparkling burgundy. It will also be appreciated that my machine provides a reliable mechanized operation with a minimum of parts and is capable of long years of satisfactory service.

I claim:

1. A wire hood loading apparatus for automatically placing wire hoods in position over a bottle closure, comprising means for holding a plurality of wire hoods with the means being formed for presenting the hoods in one-by-one fashion to a delivery position, means for positioning articles adapted to receive wire hoods in sequential fashion at a hood receiving position, a gripper constructed to engage a wire hood at the delivery position and grip the hood for movement, and carriage means for moving the gripper between the delivery position and the hood receiving position, said gripper having jaw means formed to close over the lower end of a wire hood at the hood delivery position and to open as the hood is placed over the bottle top and closure at the hood receiving position.

2. The wire hood loading apparatus defined in claim 1, in which the means for holding a plurality of wire hoods contains side members defining a chute having slots on each side for retaining the hoods in a desired orientation and holding means at the bottom of the chute for retaining the hoods in the chute with one hood at the delivery position, said holding means being constructed to allow the wire hood at the delivery station to be physically pulled from the chute and yet hold the other wire hoods in the chute.

3. The wire hood loading apparatus defined in claim 2, in which jaw means includes a pair of jaw members.

4. The wire hood loading apparatus defined in claim 3, in which the hoods are held in inverted fashion in the chute and the gripper is supported on the carriage means in a manner allowing inversion of the gripper as it moves between the hood receiving position and the hood delivery position.

5. A wire hood loading apparatus for automatically placing wire hoods which are formed from a wire frame having a generally frustoconical configuration in position over the top of a bottle and closure therefor, comprising a chute having guide means for holding a plurality of wire hoods in an inverted stacked relation for presenting the hood bottom-end down in one-by-one fashion to a hood delivery position, indexing means for positioning bottles adapted to receive wire hoods in sequential fashion at a hood receiving position, a gripper constructed to engage a wire hood at the delivery position and release the hood at the receiving position, and carriage means for moving the gripper between the delivery position and the hood receiving position and inverting the gripper during said movement so that the hood will be released over the bottle at the receiving position in proper orientation, said gripper having a pair of jaw members formed to close over the lower end of an inverted wire hood at the hood delivery position and to open as the hood is placed over the bottle top and closure at the hood receiving position.

6. The wire hood loading apparatus defined in claim 5, in which the gripper also comprises a frame member, a shaft on said frame member journaled through the carriage and adapted to impart rotation to the frame member for inversion of the gripper, and a pair of gear members journaled for rotation on said frame and meshed with each other for opposed rotation, each jaw of the pair of jaw members being mounted on each of said gear members whereby the jaw members are movable between an opened and closed position upon rotation of said gear members.

7. The wire hood loading apparatus defined in claim 6, in which spring means are provided to urge rotation of the gear members and associated jaw members to a closed position for the jaw members, and a latch is provided to hold the jaw members and associated gear members in an open position against said spring means.

8. The wire hood loading apparatus defined in claim 7, in which the latch mechanism has means associated therewith for latching the jaws in the open position at the hood receiving position, and a trigger mechanism to release the latch and allow the spring means to close the jaws at the hood delivery position.

9. A wire hood loading apparatus for automatically placing wire hoods constructed from a wire frame having a generally frustoconical configuration in position over the top of a bottle and the like, comprising means for positioning articles adapted to receive wire hoods in sequential fashion at a hood receiving position, support means disposed in juxtaposed position to said hood receiving position, a chute carried on said support means having guides for holding a plurality of wire hoods in an inverted stacked relation for presenting the hoods bottom-end down in one-by-one fashion to a hood delivery position, a carriage mounted for up and down movement on said support means, a gripper rotatably mounted on the carriage and constructed to engage a wire hood at the delivery position and grip the hood for movement to the hood receiving position, actuating means mounted on the carriage and formed for moving the gripper through partial rotation positions between an upper position of the carriage and a lower position of the carriage, and means for moving the carriage in up and down movement as bottles are positioned sequentially in the hood receiving position, said gripper and carriage movements being synchronized to provide the gripper in operative position below the stack of wire hoods at the hood delivery position when the carriage is at its upper position of travel and in position above the hood receiving position for delivery of wire hoods on the bottle when the carriage is at is lower position, and said gripper having a pair of jaw members formed to close over the lower end of an inverted wire hood at the hood delivery position and to open as the hood is placed over the bottle top and closure at the hood receiving position.

10. The wire hood loading apparatus defined in claim 9, in which the gripper also comprises a frame member, a shaft on said frame member journaled through the carriage and adapted to impart rotation to the frame member for inversion of the gripper, and a pair of gear members journaled for rotation on said frame and meshed with each other for opposed rotation, each jaw of the pair of jaw members being mounted on each of said gear members whereby the jaw members are movable between an opened and closed position upon rotation of said gear members.

11. The wire hood loading apparatus defined in claim 10, in which spring means are provided to urge rotation of the gear members and associated jaw members to a closed position for the jaw members, and a latch is provided to hold the jaw members and associated gear members in an open position against said spring means.

12. The wire hood loading apparatus defined in claim 11, in which the latch mechanism has means associated therewith for latching the jaws in the open position at the hood receiving position, and a trigger mechanism to release the latch and allow the spring means to close the jaws at the hood delivery position.

13. The wire hood loading apparatus defined in claim 6, in which the gripper also contains a gear mounted on the shaft, and the carriage also comprises a gear member in engagement with the gear on the shaft and a cam operative to impart rotation to the gear member on up and down movement of the carriage.

14. The wire hood loading apparatus defined in claim 9, in which the carriage also comprises a pair of lifters disposed on opposite sides of the chute in position to move against wire hoods in the chute and lift the wire hoods at and above a gripping position, and cam means operatively connected to said lifters for moving the lifters against the wire hoods near the upper position of the carriage whereby all the wire hoods except a controlled number in the lower part of the chute are engaged and lifted as the carriage approaches its upper limit of movement.

References Cited

UNITED STATES PATENTS 1,875,110   8/1932   Myers.

WILLIAM W. DYER, Jr., *Primary Examiner.*

N. ABRAMS, *Assistant Examiner.*